United States Patent
Gould

(10) Patent No.: US 7,343,692 B2
(45) Date of Patent: Mar. 18, 2008

(54) WIRING DEVICE/WALLPLATE INSTALLATION TOOL

(75) Inventor: Schuyler Gould, 21 Maple Grove St., Barre, VT (US) 05641

(73) Assignee: Schuyler Gould, Barre, VT (US)

( * ) Notice: Subject to any disclaimer, the term of this patent is extended or adjusted under 35 U.S.C. 154(b) by 94 days.

(21) Appl. No.: 11/156,041

(22) Filed: Jun. 17, 2005

(65) Prior Publication Data

US 2005/0282435 A1 Dec. 22, 2005

Related U.S. Application Data

(60) Provisional application No. 60/581,011, filed on Jun. 17, 2004.

(51) Int. Cl.
*G01B 5/14* (2006.01)
(52) U.S. Cl. .......................... 33/645; 33/354; 33/563; 33/DIG. 10
(58) Field of Classification Search ................ 33/451, 33/528, 562, 563, 645, DIG. 10, 354, 613; D10/64; 220/3.8
See application file for complete search history.

(56) References Cited

U.S. PATENT DOCUMENTS

| | | | | |
|---|---|---|---|---|
| 2,733,513 A | * | 2/1956 | Gatineau | 33/528 |
| 3,279,080 A | | 10/1966 | Stepshinski | |
| 3,924,331 A | * | 12/1975 | Goosen | 30/366 |
| 4,259,785 A | * | 4/1981 | Wortham | 33/528 |
| 4,589,211 A | * | 5/1986 | Policka | 33/669 |
| D298,421 S | * | 11/1988 | Tyroff | D10/69 |
| 4,888,880 A | | 12/1989 | Parker | |
| 5,040,304 A | * | 8/1991 | Jackson | 33/528 |
| 5,813,130 A | * | 9/1998 | MacDowell | 33/528 |
| 6,520,363 B1 | * | 2/2003 | Sullivan | 220/3.8 |
| 6,818,824 B1 | | 11/2004 | Marcou et al. | |

* cited by examiner

*Primary Examiner*—Alexander R. Smith

(57) ABSTRACT

Disclosed is an electrical device installation tool configured to aid in spacing, aligning, leveling, and securing, singly or in series electrical device in their boxes before installation on wall plates. The tool comprises a lower overlay with width, length and having at least a first opening configured to substantially conform to engage a portion of one type of electrical device; an upper overlay with width, length and having at least a set of first openings separated by a second opening defining a central bridge, the first and second openings configured to substantially conform to engage a portion of another type of electrical device; a pair of leveling means arranged orthogonally with each other, the leveling means mounted on the tool; and a plurality of gripping means mounted on the tool configured to facilitate a firm and accurate hold on the tool and all its secured electrical devices while in use.

12 Claims, 4 Drawing Sheets

WIRING DEVICE/WALLPLATE INSTALLATION TOOL

CLAIM OF BENEFIT TO PRIOR APPLICATIONS

This patent application claims the benefit of the earlier-filed U.S. Provisional patent application entitled "Wiring Device/Wallplate Installation Tool", having Ser. No. 60/581,011 and filed on Jun. 17, 2004.

FIELD OF THE INVENTION

The present invention relates generally to an installation device, and more particularly, to a system and method of installing electrical wiring devices and their wallplates.

BACKGROUND OF THE INVENTION

The electrical industry has essentially standardized components of many types of electrical switch and electrical receptacle systems for everyday residential and light commercial use with conventional electrical power, e.g., 120 VAC 60 Hz power, 240 VAC 60 Hz power, etc. Each of these systems generally comprises an electrical box; one or more wiring devices of various types, e.g., toggle switches, rocker switches, rotary switches, and duplex receptacles, among others; and a wallplate.

Many of these systems allow for the ganging, i.e., locating within the same electrical box, of wiring devices in various numbers and combinations. The process of roughing-in wiring devices into their respective boxes is straightforward and requires little precision in the manner of work. In order to complete the job, each wiring device is secured positively to its electrical box at opposing edges of the box, and the wall plate is in turn secured to the wiring devices.

Generally, without any sort of wiring device installation tool, it is difficult and time consuming for an installer of ganged wiring devices to ensure that each wiring device is truly vertical or horizontal, as the case may be, as well as precisely spaced from and aligned with other wiring devices with which it is ganged so that the faceplate engages all of the wiring devices properly. Therefore, "crooked" switches and outlets remain a common complaint in the building industry despite varied attempts over the years to solve this installation problem.

U.S. Pat. No. 6,818,824 discloses a ganging tool for adjusting the position of a pair of ganged wiring devices in an electrical box. This ganging tool has a frame having a pair of apertures for receiving and holding different kinds of wiring devices, rotatable toggle adaptors mounted across these apertures allowing the positioning of toggle switches when in the first of two possible positions and allowing the positioning of other types of wiring devices when in the second of two possible positions, and a leveling means for determining the level of the wiring devices. This ganging tool has a complex design that hinders the performance of the tool. It requires a rotatable toggle adapter to position combinations of different types of wiring devices, which makes the device inconvenient to use. Further, because the adapter engages only half of the margin of a toggle switch, its accuracy is unreliable.

U.S. Pat. No. 4,888,880, discloses an electrician's tool, which comprises a combination template, spirit level, and a pair of locating pins stored in the housing when not being used to locate a standard duplex outlet. A lip on the right-hand edge of the template defines a stop-forming abutment for locating a second duplex outlet or a toggle switch in the precise ganged relation necessary to accept an appropriately apertured wallplate. The edge of the tool used to locate the margin of the base of the toggle switch is not a reliable reference point because the margin is not defined by industry standards and varies from manufacturer to manufacturer. Further, there is no way to incorporate into this device a means to install the newer Decora® (or GFIC) switches and outlets. Moreover, it requires a user to install removable screws every time the user needs to position a receptacle which makes the tool clumsy to use.

U.S. Pat. No. 3,279,080 discloses a template with integrated spirit level for positioning a pair of standard duplex outlets or toggle switches in electrical boxes. On one face of the template are dowel pins positioned to engage the precise tapped openings in toggle switches which receive the screws used for the mounting of their wall plates. On the opposite face of the template are recesses configured to engage the margins of standard duplex outlets. These recesses are spanned by webs which hold the positioning dowels on the opposite face. There is no reference either in the description or the drawings to a recess defined by the contours of Decora® switches and outlets (including GFIC outlets). Nor would such a refinement be possible since the webs which hold the toggle switch positioning dowels would forbid the rocker assemblies of Decora® switches from being received into recesses sufficiently deep to engage the margins of the switch and thereby allow the proper positioning of the switch. The slots in the center of the recesses configured to engage the margins of standard duplex outlets are necessary to receive switch toggles but are so scant in their contours relative to the full contours of toggle switches that they lack significant positioning utility. The template is limited to adjusting the position of either ganged toggle switches or ganged duplex receptacles. It cannot be used for ganged combinations of different types of wiring devices. A further problem with the interface between the two faces is the impracticality of the positioning dowels located for precise registry with the tapped openings in toggle switches which receive the screws used for the mounting of their wall plates. While positioning a toggle switch or a pair of such switches is described, there is simply no place for the second pair of dowels to go when positioning either a single switch or a switch with a duplex outlet. Further, this template is clumsy and dangerous to carry due to pointed dowel pins that project from one of its surfaces.

All the devices disclosed in the prior art either cannot be adapted to a wide variety of electrical devices available today, are very complex, are not convenient in operation, have limited utility, or are not reliably accurate.

SUMMARY OF THE INVENTION

In view of the foregoing disadvantages inherent in the above-mentioned prior art, the general purpose of the present invention is: to provide an improved combination of convenience and utility, to include all the advantages of the prior art, and to overcome the above-mentioned disadvantages or drawbacks of the prior art.

The principal aspect of the present invention is to provide an improved and simplified electrical wiring device installation tool which provides the means to accurately space, align, level, and secure, singly or in series, electrical wiring devices in their boxes before installing their wallplates.

In another aspect of the present invention, an electrical wiring device installation tool comprises: a lower overlay with width, length, and depth and having two or more identical first openings in fixed relation to one another and sized and configured to substantially engage one type of electrical device; and an upper overlay with width and length substantially aligned with corresponding width and length of said lower overlay, and depth, and having second openings and third openings aligned with corresponding respective end portions of said first openings and defining central bridges between said second openings and said third openings, each bridge having an identical fourth opening therein wherein said fourth opening is sized and configured to substantially engage a second type of electrical device; said lower and upper overlays being monolithic and integral; a pair of leveling means arranged orthogonally with each other and mounted on the electrical wiring device installation tool, and a plurality of gripping means mounted on the upper overlay of the electrical wiring device installation tool.

In another aspect of the present invention, an electrical wiring device installation tool comprises: width and length substantially rectangular in shape, and depth; a lower overlay having two or more identical and substantially rectangular first openings in fixed relation to one another, said first openings having a length that is perpendicular to said length of said tool; and an upper overlay with second and third openings aligned with corresponding respective end portions of said first openings and defining central bridges between said second openings and said third openings, each bridge having an identical and substantially rectangular fourth opening therein, said fourth opening having a length that is perpendicular to said length of said tool; said lower and upper overlays being monolithic and integral; a pair of leveling means arranged orthogonally with each other and mounted on the electrical wiring device installation tool, and a plurality of gripping means mounted on the upper overlay of the electrical wiring device installation tool.

These together with other aspects of the present invention, along with the various features of novelty that characterize the invention, are pointed out with particularity in the claims annexed hereto and forming a part of this disclosure. For a better understanding of the invention, its operating advantages and the specific objects attained by its uses, reference should be made to the accompanying drawings and descriptive matter in which there are illustrated exemplary embodiments of the invention.

DETAILED DESCRIPTION OF THE INVENTION

In general, the present invention is a tool for aiding a wiring device installer, e.g., an electrician or homeowner, in installing one or more wiring devices into an electrical box, particularly simplifying the process of orienting each device and/or aligning and spacing two or more devices relative to each other so that a faceplate may be readily installed and the installation is of high quality. The unique design of the present invention allows it to be used with a number of standard wiring devices, including toggle switches, duplex receptacles, rotary switches and rocker switches. An example of rocker switches includes DECORA®. switches manufactured by Leviton Manufacturing Corporation, Little Neck, N.Y. Various ground fault circuit interrupt (GFCI) type receptacles may also be oriented, aligned and/or spaced using the tool of the present invention.

One utility of the invention is found in each group of recesses/openings formed within the tool that correspond to the various margins found on many standard wiring devices. The utility flowing from each of these groups is the ability to orient any of the standard wiring devices corresponding to the various recesses/openings in the desired orientation, e.g., vertical or horizontal. Another utility of the invention may be found in the placement of two or more of these groups side-by-side with one another at a particular spacing (e.g., the U.S. industry standard of 1.812 inches for 120 VAC 60 Hz wiring devices) that allows an installer to not only orient two or more wiring devices, but also properly align and space the devices. The tool may also include one or more levels, e.g., spirit levels, that provide an installer with information pertinent to determining proper orientation and/or alignment.

Figure 1:
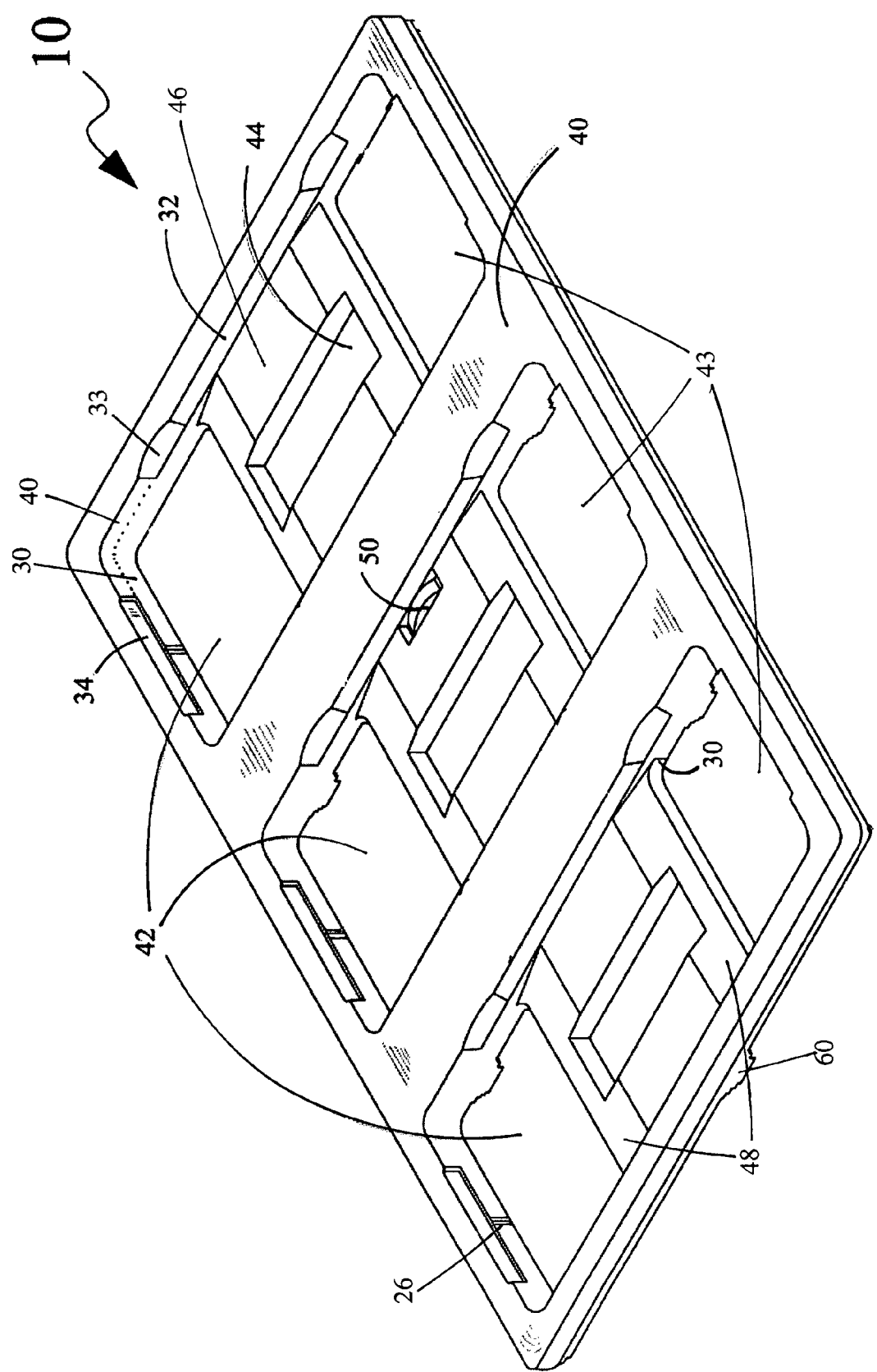
FIG. 1 is a bottom perspective view of an electrical wiring device installation tool embodying features of the present invention.
Figure 2:
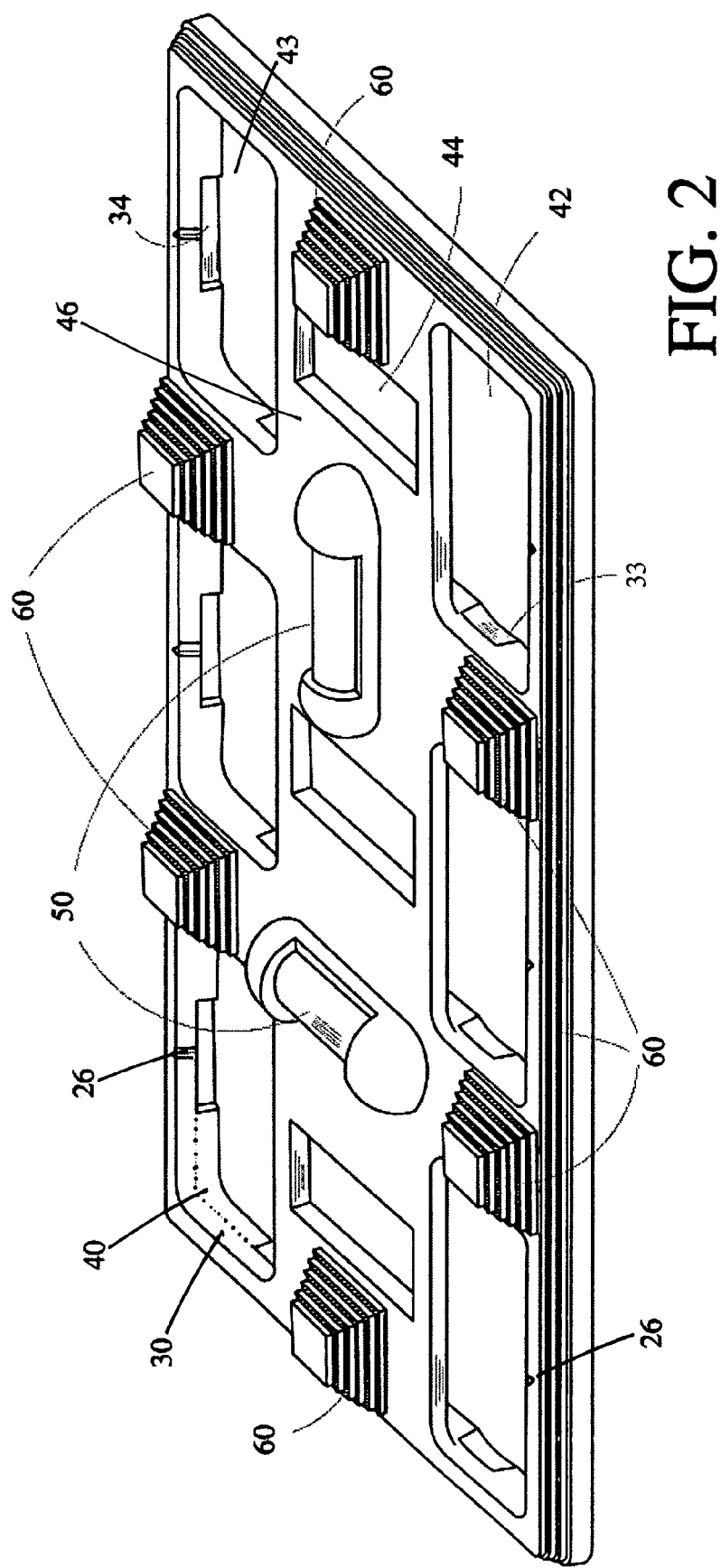
FIG. 2 is a top perspective view of the tool of FIG. 1.

FIGS. 1 and 2 show one embodiment of a tool 10 of the present invention. Although this embodiment is shown as being essentially monolithic (except for spirit levels), the main portion of tool 10 may be thought of as comprising two layers 40, 30, or "overlays," particularly aligned with, and secured to, each other. Generally, lower overlay 40 comprises two or more openings 32 each corresponding to the combined margins of a rocker switch and a standard duplex outlet.

Upper overlay 30 comprises two or more sets of openings 42, 43 aligned with corresponding respective end portions of lower overlay openings 32 and defining central bridges 46, each having identical central openings 44 corresponding to the margins of a standard toggle switch (not shown), e.g., a toggle switch having a boxed base. When upper and lower overlays 30,40 are attached to, or integrated with, one another, each central opening 44 may be considered to be present within a central bridge 46 that spans corresponding respective opening 32 in lower overlay 40. Each bridge is generally defined by two openings 42,43 in upper overlay 30 that are in registration with portions of respective opening 32 in lower overlay 40. When tool 10 is used with rocker switches, openings 42,43 receive therein portions of the rocker so that the tool properly seats with the switches. A further refinement of the tool comprises the addition of beveled regions 48 to the underside and at opposite ends of each bridge proximate openings 42 and 43. The pitch of these beveled regions corresponds to the pitch of the rockers of a rocker switch, thus allowing the tool to more fully seat over a rocker switch, which protrudes significantly from the faceplate (not shown) of a finished installation.

In order to accommodate standard (i.e., non-DECORA® type) duplex receptacles, lower overlay 40 includes edge rabbets 34 and rounded cut-outs 33 sized to receive corresponding portions of such a receptacle so as to allow tool 10 to properly seat with the receptacle.

Figure 4:
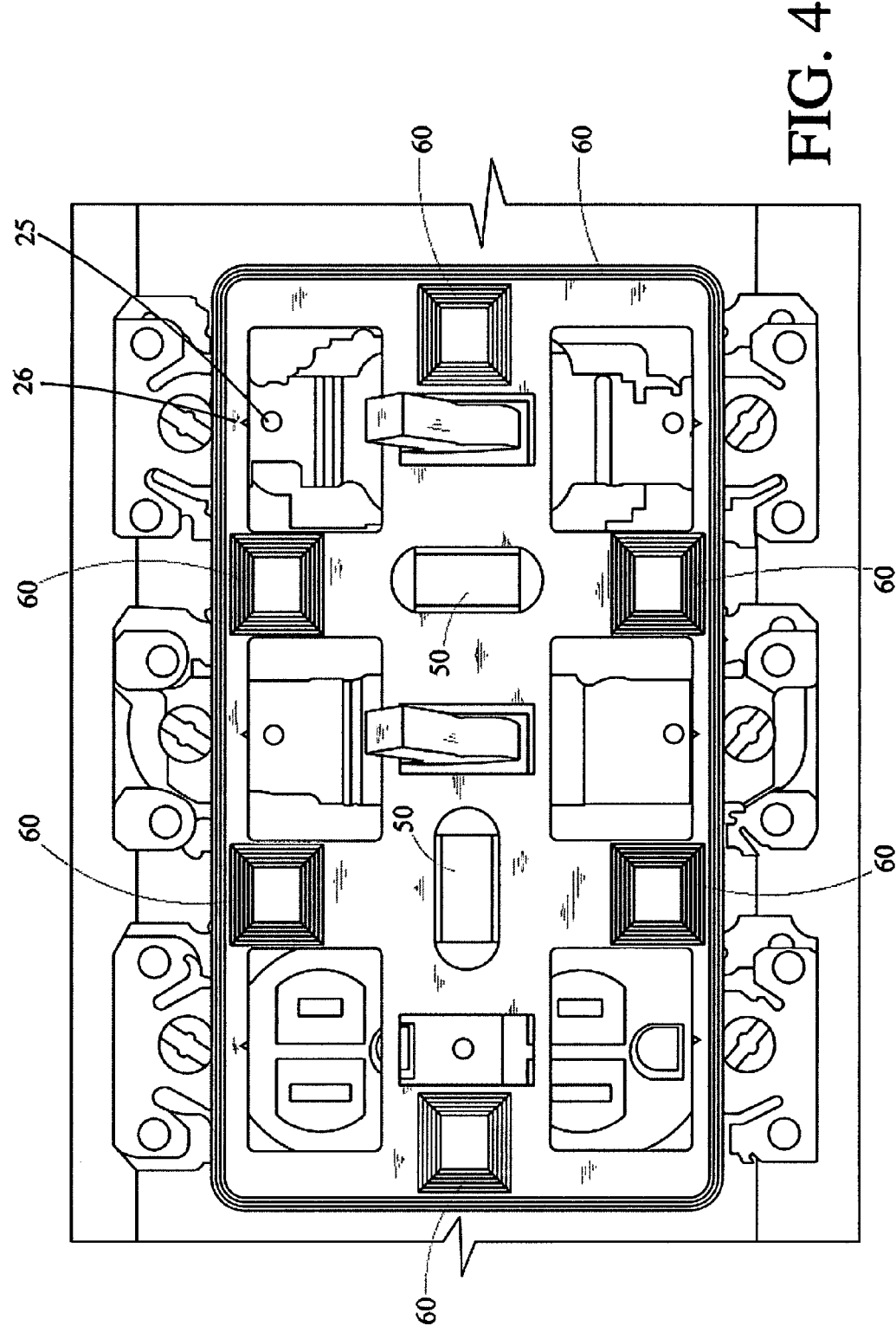
FIG. 4 is a front perspective view of the tool of FIG. 1 in use with a ganged duplex receptacle and two toggle switches.

The particular embodiment of tool 10 as shown includes two spirit levels 50 oriented orthogonally with respect to one another. This allows tool 10 to be used with both horizontally and vertically oriented wiring devices and gangs. Tool 10 may also be provided with one or more grips 60 or other structures that allow an installer to firmly grip the tool while in use. FIGS. 1, 2, and 4 show exemplary dimensions for one embodiment of tool 10. Of course, those skilled in the art will readily understand that other dimensions and configurations may be used.

Figure 3:
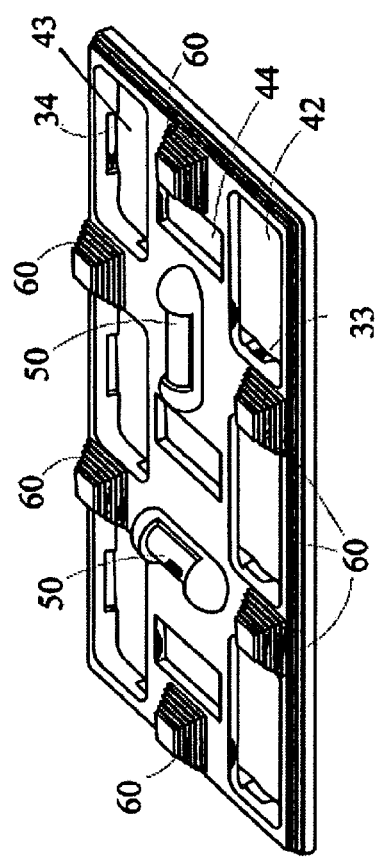
FIG. 3 is a perspective view of the tool of FIG. 1 readied for use with a ganged duplex receptacle and two toggle switches.
Figure 3:
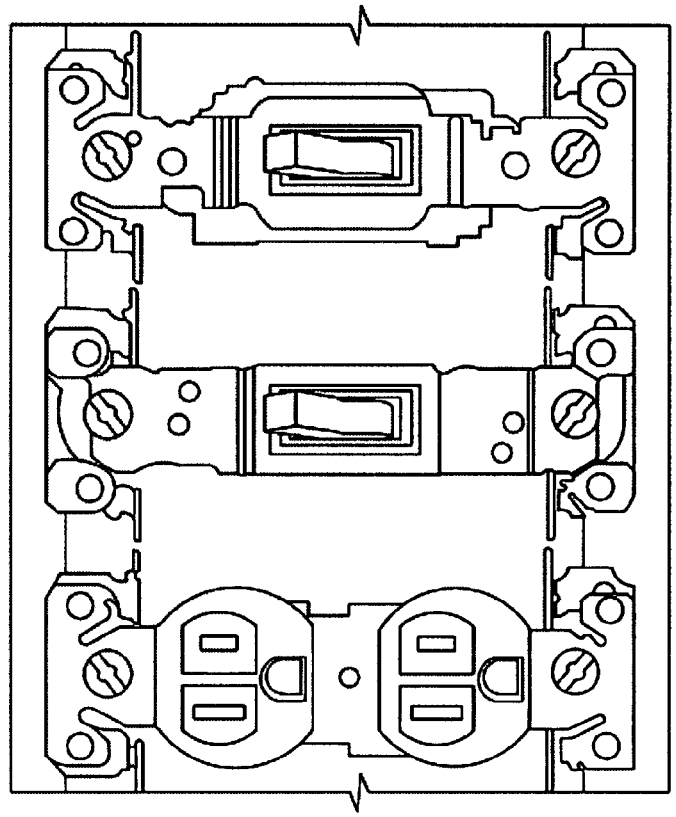

A tool of the present invention, e.g., tool 10, may be used as follows to orient, align and space a plurality of wiring devices (not shown). After the wiring devices have been roughed in to their electrical box, i.e., loosely secured to the electrical box, the tool may be laid over the wiring devices that may then be adjusted as necessary to properly orient, align and space them by properly engaging each wiring device with the corresponding group of recesses/openings (FIGS. 3 and 4). Once the wiring devices are positioned and oriented properly, the tool holds them firmly in place while they are more securely fastened to the electrical box. For ganged wiring devices of greater than two devices, the process may be begun at or near the center of the gang, with the tool then being moved over one device at a time, so as to be engaging at least one device already fully secured to the electrical box with the aid of the tool. In this manner, each additional wiring device may be properly oriented, aligned, spaced, and secured in seriatim.

Most toggle switches made today have a rectangular protruding box surrounding the toggle where the toggle extends into the body of the switch. It is this box that is typically held in place by the tool during installation. Some toggle switches, especially older ones, as well as rotary switches do not have such a box. When using the tool with these switches, it is generally necessary to estimate their proper position by aligning the wallplate mounting holes 25 (FIG. 4) on the device with the notches 26 centered at the opposing ends of upper overlay openings 42 and 43.

All specifications of the tool relating to its core function may be determined by a balance between industry standards for the different wiring devices and their faceplates, actual measurements of wiring devices, both old and new, and practical limitations on the manufacture of the tool.

The exemplary embodiments described herein detail for illustrative purposes are subject to many variations in structure and design. It should be emphasized, however that the present invention is not limited to a particular electrical wiring device installation tool as shown and described. Rather, the principles of the present invention can be used with a variety of electrical wiring device installation tool configurations and structural arrangements. It is understood that various omissions, substitutions of equivalents are contemplated as circumstances may suggest or render expedient, but is intended to cover the application or implementation without departing from the spirit or scope of the claims of the present invention.

The present invention may be made available in metal or plastic or a like light weight material. It has low cost of manufacture with regard to both materials and labor thereby serving the commercial viability of a cost effective electrical wiring device installation tool capable of reducing the installation time and overcoming all the existing drawbacks found in the prior art.

I claim:

1. An electrical wiring device installation tool, comprising:
   a lower overlay with width, length, and depth and having two or more identical first openings in fixed relation to one another and sized and configured to substantially engage one type of electrical device;
   and an upper overlay with width and length substantially aligned with corresponding width and length of said lower overlay, and depth, and having second openings and third openings aligned with corresponding respective end portions of said first openings and defining central bridges between said second openings and said third openings, each bridge having an identical fourth opening therein wherein said fourth opening is sized and configured to substantially engage a second type of electrical device;
   said lower and upper overlays being monolithic and integral.

2. A tool according to claim 1, wherein said first opening is sized and configured to substantially engage a standard rocker switch.

3. A tool according to claim 1, wherein said first opening is sized and configured to substantially engage a standard duplex outlet.

4. A tool according to claim 1, wherein said fourth opening is sized and configured to substantially engage a standard toggle switch.

5. A tool according to claim 1, wherein said central bridge is beveled on its underside at opposite ends of said bridge proximate said second opening and said third opening.

6. A tool according to claim 1, wherein said tool is substantially rectangular in shape and said first openings are substantially rectangular in shape with length that is perpendicular to the length of said tool.

7. A tool according to claim 1, wherein said tool includes a leveling means.

8. A tool according to claim 1, wherein said tool includes a gripping means mounted on said upper overlay.

9. A tool according to claim 1, wherein said tool includes a notch centered at opposing ends of said second openings and said third openings.

10. An electrical device installation tool, comprising:
    width and length substantially rectangular in shape, and depth;
    a lower overlay having two or more identical and substantially rectangular first openings in fixed relation to one another, said first openings having a length that is perpendicular to said length of said tool;
    and an upper overlay with second and third openings aligned with corresponding respective end portions of said first openings and defining central bridges between said second openings and said third openings, each bridge having an identical and substantially rectangular fourth opening therein, said fourth opening having a length that is perpendicular to said length of said tool;
    said lower and upper overlays being monolithic and integral.

11. A tool according to claim 10, wherein said tool includes an edge rabbet disposed at each widthwise edge of each of said first openings.

12. A tool according to claim 10, wherein said tool includes a rounded cutout disposed at each lengthwise edge of each of said first openings.

* * * * *